United States Patent [19]

Tsuji et al.

[11] Patent Number: 4,969,054
[45] Date of Patent: Nov. 6, 1990

[54] HAND-HELD MANUALLY SWEEPING APPARATUS FOR READING IMAGE DATA

[75] Inventors: Akio Tsuji, Akishima; Hiroshi Yajima, Hamura, both of Japan

[73] Assignee: Casio Computer Co., Ltd., Tokyo, Japan

[21] Appl. No.: 317,646

[22] Filed: Mar. 1, 1989

[30] Foreign Application Priority Data

Mar. 7, 1988 [JP] Japan .................................. 63-52970

[51] Int. Cl.⁵ ............................................ H04N 1/024
[52] U.S. Cl. ..................................... 358/473; 358/445; 382/59
[58] Field of Search ....................... 358/473, 445, 444; 382/59

[56] References Cited

U.S. PATENT DOCUMENTS

| | | | |
|---|---|---|---|
| 4,523,235 | 6/1985 | Rajchman | 358/473 |
| 4,611,246 | 9/1986 | Nihei | 358/473 |
| 4,717,965 | 1/1988 | Mashiko et al. | 358/473 |
| 4,750,049 | 6/1988 | Murakami et al. | 358/473 |

FOREIGN PATENT DOCUMENTS

| | | |
|---|---|---|
| EP-A-0146472 | 6/1985 | European Pat. Off. . |
| EP-A-0278004 | 8/1988 | European Pat. Off. . |
| 56-116360 | 9/1981 | Japan .................................. 358/473 |

*Primary Examiner*—Edward L. Coles, Sr.
*Attorney, Agent, or Firm*—Frishauf, Holtz, Goodman & Woodward

[57] ABSTRACT

A hand-held manually sweeping copier is manually swept over a medium so as to obtain image data corresponding to image information on the medium via an image sensor of a CCD type or the like. The image data obtained via the image sensor is arranged in order, in accordance with the sweeping direction of the copier, and stored in a memory, the addressing of which is controlled in accordance with the sweeping direction of the copier. In addition, the copier prints the image data on a printing medium, i.e., a plain paper, while the copier is being manually swept across the printing medium.

9 Claims, 6 Drawing Sheets

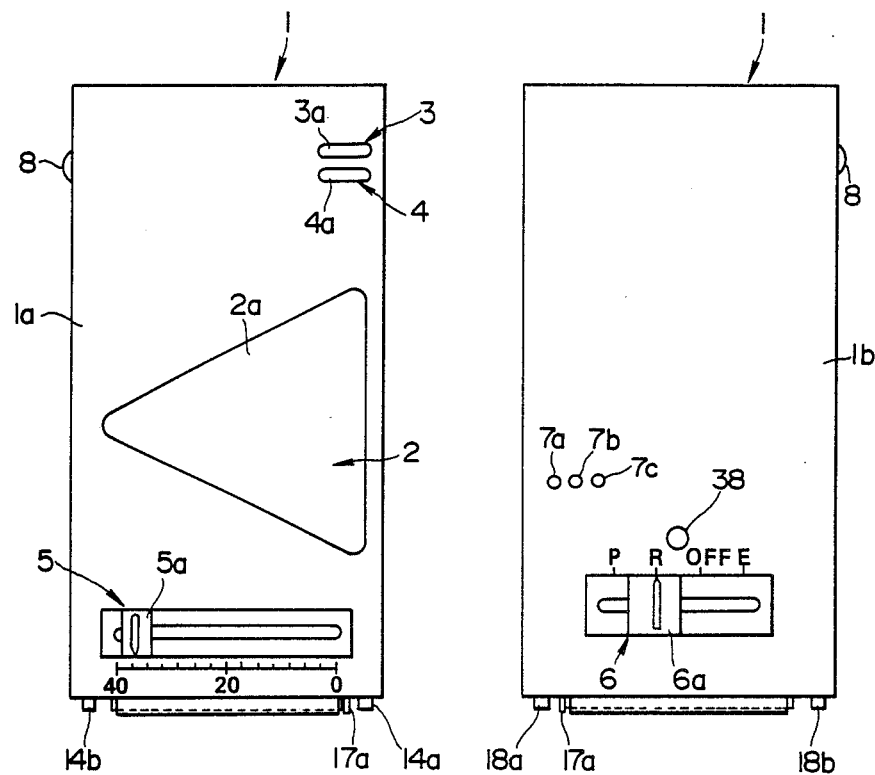
FIG.1        FIG.2

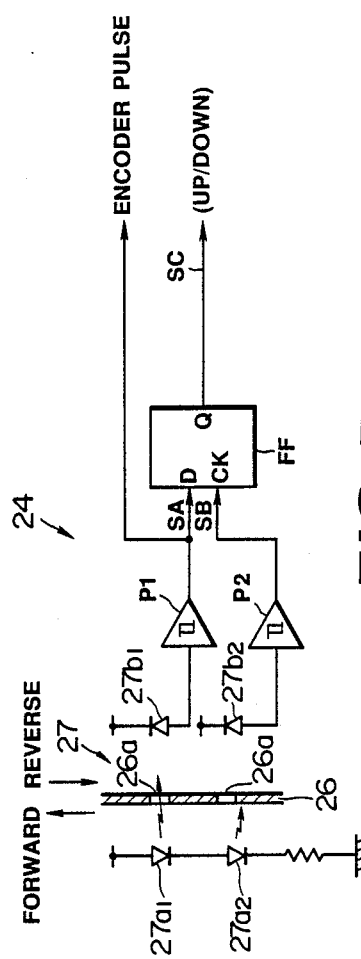
FIG. 5
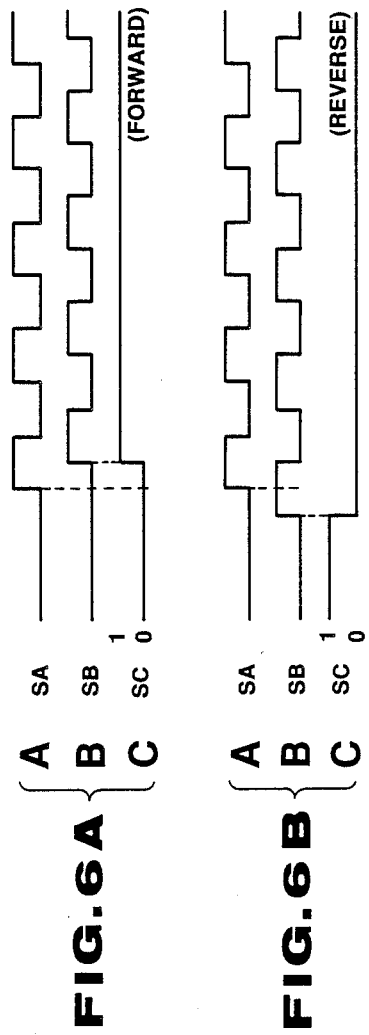
FIG. 6A
FIG. 6B

HAND-HELD MANUALLY SWEEPING APPARATUS FOR READING IMAGE DATA

BACKGROUND OF THE INVENTION

1. Field of the Invention

The present invention relates to a sweeping apparatus which can read data from an original while being swept across the original.

2. Description of the Related Art

Various manually sweeping apparatus such as an image scanner, a hand-held copier, and a hand-held scanner, are known which can read data from an original as they are swept across the original. Each of these apparatuses is designed to read data when it is swept over the original in a predetermined sub-scanning direction, and not to read data when it is moved in the reverse direction. This is because the image sensor incorporated in the apparatus can read data in one direction only. Hence, when the apparatus is swept across the original in the reverse direction, the image read from the original will be inverted, the left side right.

These manually sweeping apparatuses are used to read data from originals of various types, such as a single sheet of paper, a book, and magazine. To read only part of the data printed on one page, the user needs, in some cases, to sweep the apparatus in the reverse direction. In view of this the conventional sweeping apparatuses are neither convenient nor useful.

SUMMARY OF THE INVENTION

Accordingly, the object of the present invention is to provide a sweeping apparatus which can correctly read image data from an original when it is swept across the originals not only in the predetermined sub-scanning direction, but also in the reverse direction.

According to this invention, there is provided an image data reading apparatus which comprises:

housing means which is sweepable across a material having image data;

image data reading means carried by said housing means, for reading image from the material while said housing is being swept across the material;

sweeping direction detecting means for detecting whether said housing means is swept forward or backward across the material; and image data correcting means for correcting the image data read by said image data reading means while said housing is being swept in either direction, in accordance with the sweeping direction detected by said sweeping direction detecting means, thereby to reproduce image data in an accurate format.

Due to the image data correcting means, the apparatus can read data correctly from an original, regardless of the direction in which the housing is swept across the original. Hence, the user can mover the housing in a desirable direction to read data from any type of an original, a book, a sheet of paper, or a magazine.

BRIEF DESCRIPTION OF THE DRAWINGS

FIG. 1 a front view of a manually sweeping copier according to one embodiment of the present invention;

FIG. 2 is a back view of the copier shown in FIG. 1;

FIG. 5 is a diagram illustrating, in detail, the encoder unit shown in FIG. 4;

FIGS. 6A and 6B are timing charts representing the waveforms of the pulses output by the encoder unit shown in FIG. 5.

DETAILED DESCRIPTION OF THE PREFERRED EMBODIMENTS

Figure 3:
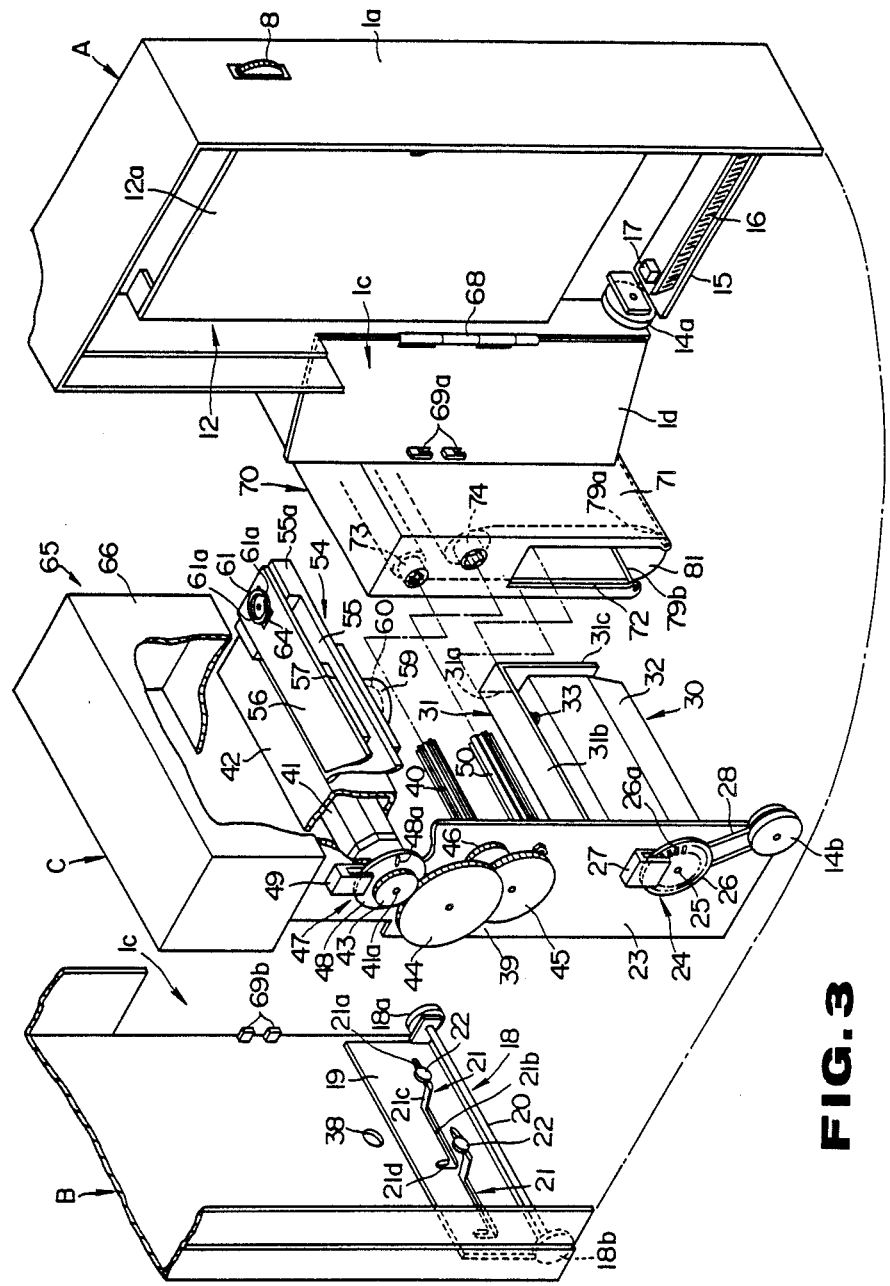
FIG. 3 is an exploded perspective view of the copier, showing the internal structure of the copier.

An embodiment of the present invention will now be described with reference to the accompanying drawings.

FIGS. 1 and 2 are a front view and a back view of a manually sweeping copier which is a first embodiment of the present invention. The copier comprises a housing 1 which is a rectangular box and is small enough to be held by hand. As is shown in FIG. 1, a start switch 2 is mounted on the center part of the front surface of housing 1. An enlarge-print key 3 and a reset/clear key 4 are arranged on the upper-right part of the front surface. Further, a reading-width switch 5 is arranged on the lower part of the front surface. As is shown in FIG. 2, a mode-selecting switch 6, a power-on indicating LED (light-emitting diode) 7a, a memory alarm LED 7b, and a speed alarm LED 7c are provided on the back of housing 1. As is evident from both FIGS. 1 and 2, a print-detesity dial 8 is mounted on one side of the housing 1. Reading-width switch 5 is designed to set a width over which image data will be read from an original. Power-on indicating LED 7a emits light as long as the copier is supplied with electric power. Memory alarm LED 7b is automatically turned on when the vacancy of the memory (later described) incorporated within the housing 1 decreases below a predetermined value. Speed alarm LED 7c is automatically turned on when the housing 1 is moved at a speed higher than a predetermined value. Print-density dial 8 is rotated to set a desired density in which image data will be printed on recording paper.

As is shown in FIG. 3, the manually sweeping copier comprises a front-case block A, a rear-case block B, and a chassis block C. Case blocks A and B constitute housing 1, and chassis block C is located within housing 1.

As is shown in FIGS. 1 and 3, front case block A comprises front case 1a, start switch 2, enlarge-print key 3, reset/clear key 4, reading-width switch 5, and print-density dial 8. Switches 2 and 5, and keys 3 and 4 are arranged on the outer surface of front case 1a. Print-density dial 8 is attached to one side of front case 1a. Start switch 2 is turned on when large button 2a, which is mounted on the outer surface of case 1a, is depressed. Enlarge-print key 3 is turned on when button 3a, inserted in a hole cut in case 1a, is pushed in. Similarly, reset/clear key 4 is turned on when button 4a, also inserted in a hole made in case 1a, is depressed. Reading-width switch 5 is a slide switch and has a sliding member 5a which can slide on the outer surface of case 1a.

As is shown in FIG. 3, control unit 12 is fastened to the inner surface of front case 1a. Control unit 12 comprises circuit board 12a and a plurality of LSI chips (not shown) mounted on circuit board 12a. Switches 2 and 5, and keys 3 and 4 are connected to control unit 12. A print-density control circuit (not shown), which includes print-density dial 8, is amounted on circuit board 12a. Dial 8 protrudes from one side of front case 1a. First paper-contacting roller 14a is rotatably mounted on a shaft projecting horizontally and inwardly from that side of case 1a which opposes the side on which dial 8 is provided. This roller 14a slightly protrudes from the lower end of front case 1a. Horizontal plate 15 extends from the inner surface of front case 1a. LED array 16 for illuminating an original is mounted on horizontal plate 15. Touch-detecting switch 17 is also mounted on plate 15. Touch-detecting switch 17 is designed to detect whether or not the housing 1 completely contacts an original or a sheet of printing paper. Switch 17 comprises a micro switch having an operation pin. This pin is biased downward by a spring such that it protrudes from the lower end of front case 1a. Hence, when housing 1 comes into contact with the original or the printing paper, the operation pin abuts on the original or the paper, and subsequently moves upward. Switch 17 is turned on when the operation pin moves upward.

As is illustrated in FIGS. 2 and 3, rear case block B comprises rear case 1b, mode-selecting switch 6, power-on indicating LED 7a, memory alarm LED 7b, and speed alarm LED 7c. Mode-selecting switch 6 is a slide switch and has sliding member 6a which can slide on the outer surface of rear case 1b. Sliding member 6a can take four positions, i.e., a P-position (print-mode position), an R-position (read-mode position), an OFF-position (power-off position), and an E-position (cassette-eject position). When member 6a is at the OFF-position, mode-selecting switch 6 disconnects a power supply from any component of the copier, that require electric power to perform its function. When member 6a is moved to the P-position or the R-position, switch 6 connects the power supply to components which require electric power, and sets the copier to the print mode or the read mode. Mode-selecting switch 6 is connected by lead lines (not shown) to control unit 12 fastened to front case block A.

Auxiliary roller unit 18 is secured to the lower part of the inner surface of rear case 1b. This unit 18 comprises movable plate 19 which can vertically slide on the inner surface of rear case 1b, horizontal shaft 20 which is rotatably supported at both end portions on movable plate 19, and auxiliary paper-contacting rollers 18a and 18b which are fastened to the ends of shaft 20, respectively. Auxiliary roller unit 18 is moved up or down when the sliding member 6a of mode-selecting switch 6 is moved to the left or the right (FIG. 2). Plate 19 has two cam slits 21. Each of cam slits 21 consists of lower horizontal section 21a, upper horizontal section 21b, slanted section 21c connecting horizontal sections 21a, and vertical section 21d extending from that end of upper horizontal section 21b which is opposite to the end connected slanted section 21c. Two cam pins 22, both fixed to sliding member 6a, extend through cam slits 21, respectively. Hence, when member 6a is moved to the left or the right, cam pins 22 move in cam slits 21. More specifically, when member 6a is at the P-position, thus setting the copier in the print mode, cam pins 22 are located in lower horizontal section 21a of cam slits 21. When member 6a is moved to the R-position, thereby setting the copier in the read mode, cam pins 22 move to the starting ends of upper horizontal sections 21b, after passing through slanted sections 21c. As pins 22 pass through slanted sections 21c, they push movable plate 19 downwardly. When sliding member 6a is moved from the R-position to the OFF-position, thus disconnecting the power supply to the electrically operated components, cam pins 22 move to the middle portions of upper horizontal sections 21b. When member 6a is further moved to the E-position (i.e., the cassette-eject position), cam pins 22 move into vertical sections 21d. Hence, auxiliary roller unit 18 is moved up when mode-selecting switch 6 is operated to select the print mode, and is moved down when switch 6 is operated to select the read mode. When the copier is set to the print mode, both auxiliary paper-contacting rollers 18a and 18b are located such that their lowest portions are at substantially the same level as the lowest portion of first paper-contacting roller 14a. On the other hand, when the copier is set to the read mode, rollers 18a and 18b are located such that their lowest portions are slightly below the level at which the lowest portion of first paper-contacting roller 14a is positioned. Auxiliary roller unit 18 is located at the same position as in the read mode, when sliding member 6a of switch 6 is moved to the OFF-position. Furthermore, when member 6a is moved to the E-position (i.e., the cassette-eject position), cam pins 22 can slip into vertical sections 21d of cam slits 21, and auxiliary roller unit 18 can, thus, be further lowered from the lower end of housing 1, by moving housing 1 upwardly.

As has been described, chassis block C is incorporated within housing 1 composed of front case block A and rear case block B. As is illustrated in FIG. 3, chassis block C comprises chassis 23 which extends vertically, along the sides of both case blocks A and B. Chassis block C further comprises second paper-contacting roller 14b, main encoder unit 24, print head unit 30, ribbon take-up unit 39, read unit 54, and power-supply unit 65 all attached to chassis 23.

Second paper-contacting roller 14b is rotatably secured to the lower end of one side of chassis 23. Roller 14b, which makes a pair with first paper-contacting roller 14a, is located at the same level as roller 14a. Housing 1 can be swept across an original or a sheet of printing paper, with two paper-contacting rollers 14a and 14b and two auxiliary paper-contacting rollers 18a and 18b kept in contact with, and rotating on the original or the printing paper.

Main encoder unit 24 is attached to the outer surface of that side of chassis 23 on which second paper-contacting roller 14b is rotatably mounted. This unit 24 is designed to detect, from the rotation of roller 14b, the distance the housing 1 has been moved across the original or the printing paper. Main encoder unit 24 comprises pin 25 horizontally projecting from the side of chassis 23, disk 26 rotatably mounted on pin 25, and rotation detector 27 fixed to the side of chassis 23 for detecting the angle through which disk 26 has rotated. As is evident from FIG. 3, disk 26 has a number of slits 26a extending in the radial direction and regularly spaced apart in the circumferential direction. Rotation detector 27 has a U-shaped cross section, and is positioned such that disk 26 is partly interposed between the legs of detector 27. A light-emitting element (not shown) such as a light-emitting diode is attached to the first leg of detector 27, and a light-receiving element (not shown, either) such as a photo-transistor is fastened to the second leg of detector 27, for receiving the light emitted from the light-emitting element and passing through any one of radial slits 26a of disk 26. A pulley (not shown) is coaxially attached to disk 26, and a pulley (not shown) is coaxially connected to second paper-contacting roller 14b. Endless belt 28 is wrapped around these pulleys. Therefore, when roller 14a rotates, disk 27 is rotated, driven by belt 28. As disk 26 is thus rotated, radial slits 26a sequentially come into alignment with the light beam emitted from the light-emitting element. The light beam passing through any slit 26a is applied to the light-emitting element. Every time it receives light, the light-receiving element generates an electrical pulse. Hence, the more the disk 26 is rotated, the more pulses the light-receiving element generates. As a result, the number of the pulses produced by the light-receiving element represents the angle through which roller 14b has rotated, or the distance for which housing 1 has been swept across the original or the printing paper.

Print head unit 30 is secured to the inner surface of the lower portion of chassis 23. Print head unit 30 comprises head-supporting frame 31 fastened to the lower portion of chassis 23, thermal print head 32 supported by frame 31, and a pair of springs 33 pushing head 32 downward. Head-supporting frame 31 consists of a back plate (not shown) vertically extending at the back of print head 32, upper plate 31b horizontally extending from the upper edge of the back plate, and side plate 31c vertically extending. The back plate and upper plate 31b are fastened, at one end to chassis 23. Side plate 31c is connected to the other ends of the back plate and upper plate 31b. Springs 33, both biasing head 32 downward, are coil springs having the same force. They are interposed between the upper surface of head 32 and the upper plate 31a of head-supporting frame 31. A head-inclination adjust screw (not shown) is fastened to the back plate. Rear case 1b has through hole 38, thereby exposing the head-inclination adjust screw. Hole 38 is large enough to allow the passage of the shaft of a screw driver. Hence, the screw can be turned to adjust the inclination of head 32, by means of a screw driver. The inclination adjustment is carried out, with ribbon cassette 70 removed from housing 1.

Ribbon cassette 70 is inserted in housing 1. Cassette 70 contains take-up spool 73, ribbon-feeding spool 74, and a roll of ribbon 81. Take-up spool 73 is automatically coupled to ribbon take-up unit 39 when cassette 70 is set at a prescribed position within housing 1. Ribbon take-up unit 39 comprises ribbon take-up shaft 40 for rotating take-up spool 73, and electric motor 41 for driving ribbon take-up shaft 40. Shaft 40 is fitted into the axial hole of take-up spool 73 when cassette 70 is set at said prescribed position. Shaft 40 is rotatably supported, at one end, by chassis 23, and extends in the horizontal direction. Motor 41 is placed in motor housing 42 located above ribbon take-up shaft. Shaft 41a of motor 41 projects out of chassis 23 through a hole (not shown) made in the side of chassis 23. Driver gear 43 is connected to the tip of motor shaft 41a. Gear 43 meshes with first idler gear 44 rotatably attached to chassis 23. First idler gear 44 meshes with second idler gear 45 which is also rotatably attached to chassis 23. Second idler gear 45 meshes with driven gear 46 fastened to the end of ribbon take-up shaft 40.

Print head unit 30 further comprises motor encoder unit 47. Motor encoder unit 47 is designed to detect the ribbon take-up speed, i.e., the speed of rotation of take-up shaft 40, from the speed of rotation of electric motor 41. Unit 47 includes disk 48 fastened to motor shaft 41a and having one radial slit 48a, and rotation detector 49 secured to chassis 23. Like detector 27, rotation detector 49 has a U-shaped cross section, and is located such that disk 48 is partly interposed between the legs of detector 49. A light-emitting element (not shown) and a light-receiving element (not shown, either) are attached to the legs, respectively, and optically aligned with each other. Thus, every time the radial slit 48a of disk 48 comes into alignment with the light beam emitted from the light-emitting element, that is, every time disk 48 rotates 360°, the light-receiving element receives the light beam and generates one electrical pulse.

Ribbon-feeding shaft 50 horizontally extends and, thus parallel to ribbon take-up shaft 40, and is located below shaft 40. Shaft 50 is a hollow one and has ridges extending parallel along the axis of shaft 50 and regular spaced apart in the circumferential direction thereof. One end portion of shaft 50 is inserted in a hollow cylinder (not shown) fixed to chassis 23, and can rotate about its axis and move along its axis. The other end portion of shaft 50 is automatically inserted into the hole made in take-up spool 74 of ribbon cassette 70 when cassette 70 is set in the prescribed position within housing 1.

Read unit 54 for reading image data from the original is also attached to chassis 23. Read unit 54 comprises base 55 which is fastened, at one end, to chassis 23 and located in front of motor housing 42, reading-circuit board 56 coupled to base 55, and linear sensor 57 attached to the lower surface of board 56. Linear sensor 57 is an image sensor such as a CCD (charge-coupled device). Linear sensor 57 has an array of photosensing elements, which extends at right angles to the direction in which housing 1 is swept across the original. In other words, the array of photosensing elements extends in the lengthwise direction of circuit board 56.

Read unit 54 further includes lens tube 59 protruding downward from base 55. Tube 59 contains focusing lens 60 which focuses the light reflected from the original illuminated by LED array 16, onto the light-receiving surface of linear sensor 57. Circuit board 56 is supported by board-supporting member 55a projecting upwardly from base 55, and can slide upon this member 55a in its width direction (i.e., the direction at right angles to the array of photosensing elements of sensor 57. If necessary, circuit board 56 is moved to bring the array into alignment with the optical axis of focusing lens 60.

Power source unit 65 is attached to the upper end portion of chassis 23. This unit 65 comprises a battery accommodated in battery housing 66 located at the upper end of chassis 23.

As can be understood from the above, chassis block C comprises second paper-containing roller 14b; main encoder unit 24 having disk 26 rotation detector 27, and the mechanism for transmitting the rotation of roller 14b to disk 26; print head unit 30 having print head 32, springs 33, and the mechanism for adjusting the inclination of head 32; ribbon take-up unit 39 having ribbon take-up unit 39, motor 41 for rotating unit 40, and motor encoder unit 47; ribbon-feeding shaft 50 having a braking mechanism; and read unit 54 having linear image sensor 57, focusing lens 60, and the mechanism for adjusting the position of sensor 57. Roller 14b, main encoder unit 24, print head unit 30, ribbon take-up unit 39, ribbon-feeding shaft 50, and read unit 54 are mounted on chassis 23.

The manually sweeping copier, which has been described, is assembled in the following way. First, chassis block C is positioned in rear case 1b, such that second paper-contacting roller 14b is located at the same level as first paper-contacting roller 14a coupled to front case 1a. Then, the chassis 23 is fastened to rear case 1b, thus connecting chassis block C to rear case block B. Further, front case block A is connected to rear case block B by fitting front case 1a to rear case 1b.

Ribbon cassette 70 will now be described in detail. Cassette 70 comprises case 71 which is a rectangular box having an open lower end. Case 71 is short enough to be interposed between the bottom of housing 1 and motor housing 42, and is thin enough not to cover up the light-receiving surface of linear sensor 57. Vertical slit 72 is cut in one side of case 71. This slit 72 is sufficiently long and wide to allow print head unit 30 to enter case 71 when ribbon cassette 70 is placed at the prescribed position within housing 1. Take-up spool 73 and ribbon-feeding spool 74 are incorporated in case 72. These spools 73 and 74 extend in the horizontal direction, and parallel to each other, as can be understood from FIG. 3. They are hollow shafts, each having axial grooves cut in the inner periphery. When cassette 70 is set at the prescribed position, the ridges of ribbon take-up shaft 40 are shaft to are inserted into the grooves of spool 74. A pair of ribbon-guiding bars 79a and 79b horizontally extend in the lower portion of case 71. Ribbon 81 fed from the role mounted on ribbon-feeding spool 74 is wrapped around, and guided by, these ribbon-guiding bars 79a and 79b, such that ribbon 81 is exposed at the open lower end of case 71.

As is shown in FIG. 3, cassette slot 1c is cut in one side of housing 1, more precisely, in the sides of front case 1a and rear case 1b. Cover 1d is movable attached to front case 1a by means of hinge 68, to close cassette slot 1c. Two hooks 69a are fixed to the inner surface of cover 1d. Both hooks 69a are coupled to a lock member (not shown) which is mounted on the outer surface of cover 1d and can slide up and down. When the lock member is moved downward, hooks 69a engage with two projections 69b protruding from the inner surface of rear case 1b, provided that cover 1d is in the closed position. As a result, cover 1d is locked. When the lock member is moved upward, hooks 69a disengage from projections 69b, whereby cover 1d is released.

Cover 1d is opened, and then ribbon cassette 70 is loaded into, or ejected from, housing 1 through cassette slot 1c. To load cassette 70 into housing 1, cassette 70 is positioned such that vertical slit 72 is aligned with print head unit 30, and the projecting end portions of spools 73 and 74 are set coaxially with ribbon take-up shaft 40 and ribbon-feeding shaft 50. Ribbon cassette 70, thus positioned, is inserted into housing 1 via slot 1c. As cassette 70 is gradually inserted, print head unit 30 enters case 71 through vertical slit 72 until print head 32 is arranged above the exposed portion of ribbon 81. At the same time, ribbon take-up shaft 40 and ribbon-feeding shaft 50 are fitted into take-up spool 73 and ribbon-feeding spool 74, respectively. After cassette 70 has been set at the prescribed position within housing 1, cover 1d is closed and locked, thereby holding cassette 70 in said position. Before loading ribbon cassette 70 into housing 1, the sliding member 6a of mode-selecting switch 6 is moved to the E-position, causing auxiliary roller unit 18 to move downwardly. Once unit 18 has been moved down, auxiliary paper-contacting roller 18a, which is located near cassette slot 1c, does not hinder the loading of ribbon cassette 70. Also, to eject cassette 70 out of housing 1 via slot 1c, sliding member 6a is moved to the E-position, whereby unit 18 is moved down to ensure an easy, smooth ejection of ribbon cassette 70. (Auxiliary roller unit 18 can move down when sliding member 6a is at the E-position, since both cam pins 22, which are fastened to member 6a, are located at the lower ends of vertical sections 21d of cam slits 21.)

Figure 4:
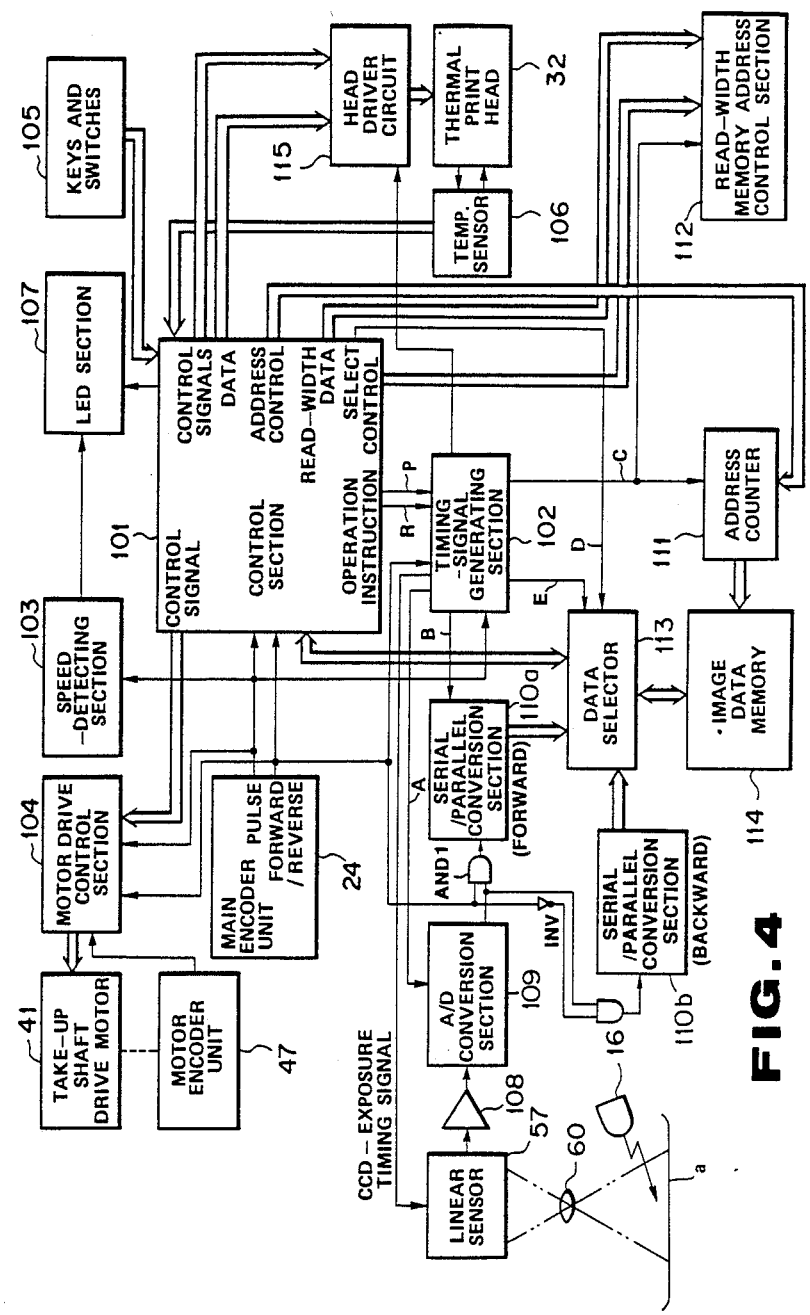
FIG. 4 is a block diagram showing the electric circuit of the copier shown in FIG. 1.

The electronic circuit, the main component of which is circuit board 12a (FIG. 3), will now be described, with reference to FIG. 4. Main encoder unit 24, which comprises disk 26 and rotation detector 27, generates a pulse signal which represents the distance the housing 1 has been moved. It also generates a forward/reverse signal representing the direction in which disk 26 is rotating. The pulse signal is supplied to control section 101, timing-signal generating section 102 speed-detecting section 103, and motor drive control section 104. The forward/reverse signal is supplied to control section 101, timing-signal generating section 102, and motor drive control section 104. The signals output from keys and switches 105, such as start switch 2, enlarge-print key 3, reset/clear key 4, reading-width switch 5, mode-selecting switch 6 and print-density dial 8, are input to control section 101. Further, the temperature signal, which has been output by temperature sensor 106 and represents the temperatures of print head 32 and printing paper b, is supplied to control section 101. Control section 101 includes a power-supply voltage detector (not shown). In accordance with the signals output from keys and switches 105, control section 101 produces control signals for controlling power-on indicating LED 7a, speed alarm LED 7c, and some other components. Further, section 101 outputs operation command R when mode-selecting switch 6 has been operated to select the read mode, and operation command P when switch 6 has been operated to select the print mode. The operation command is supplied from control section 101 to timing-signal generating section 102.

When the operation command R is given from control section 101 to timing-signal generating section 102, section 102 outputs a CCD-exposure timing signal of a predetermined frequency, and also produces other timing signals, each having a prescribed frequency, such as a read-timing signal A, a serial/parallel conversion signal B and a clock pulse signal C, in synchronism with the pulse signal supplied from main encoder unit 24 and representing the distance the copier has been moved. On the other hand, when the operation command P is given from control section 101 to timing-signal generating section 102, section 102 generates a print-timing signal in synchronism with the pulse signal output by main encoder unit 24, provided that unit 24 also supplies the forward signal to timing-signal generating section 102.

The CCD-exposure timing signal, which has been output by timing-signal generating section 102, is input to linear sensor 57. Read-timing signal A, also output by section 102, is supplied to A/D conversion section 109. The serial/parallel conversion signal B, also output by section 102, is supplied to serial/parallel conversion sections 110a and 110b. The clock pulse signal C, which has been produced by section 102, is supplied to address counter 111 and read-width memory address control section 112.

Linear sensor 57 converts the light reflected from the original a into an electric signal in synchronism with the CCD-exposure timing signal. The electric signal is input to A/D conversion section 109. Section 109 converts the signal into a binary signal (black and white) in synchronism with read-timing signal A. The binary signal is supplied to serial/parallel conversion section 110a or 110b, in accordance with a forward/reverse signal supplied from main encoder unit 24. Either serial/parallel conversion section converts the binary signal into, for example, 8-bit parallel signals in synchronism with the serial/parallel conversion signal B. More specifically, serial/parallel conversion section 110a receives every eight bits from A/D conversion section 109 and shifts them forward from the 0th bit to the 7th bit, while housing 1 is being moved forward across the original a, thereby converting the 8-bit serial data into 1-byte parallel data. Similarly, serial/parallel conversion section 110b receives every eight bits from A/D conversion section 109 and shifts them in the reverse direction, from the 7th bit to the 0th bit, while housing 1 is being moved backward across the original a, thereby converting the 8-bit serial data into 1-byte parallel data. The 1-byte parallel data, output by either section 110a or section 110b, is stored via data selector 113 into image data memory 114. Data selector 113 is connected to control section 101 by means of a data line. Section 101 supplies a select signal D to data selector 113. In accordance with the select signal D, data selector 113 is coupled to control section 101, or to serial/parallel conversion section 110a or serial/parallel conversion section 110b. Whether the data selector is connected to section 110a or 110b is determined by the forward/reverse signal supplied from main encoder unit 24. Further, timing signal-generating section 102 outputs a select signal E to data selector 113. In accordance with this signal E, selector 113 selects either the data output by serial/parallel conversion section 110a or the data output by serial/parallel conversion section 110b.

Address counter 111 designates any write address (i.e., a combination of a row address and a column address) of image data memory 114. The address of the last column is designated by the read-width memory address control section 112. Address counter 111 has a row-address section and a column-address section. In response to the DOWN signal which timing signal-generating section 102 outputs while housing 1 is being moved backward across the original a, address counter 111 counts down he column for each row of image data, from the last-column address to the first-column address. Each line of the image data is therefore read into memory 114 in the order reverse to the order in which has been read by linear sensor 57.

Meanwhile, control section 101 supplies read-width address data is supplied to read-width memory address control section 112, when read-width switch 5 is operated to select a read width. Address counter 111 counts write addresses the number of which is proportional to the read width set by operating read-width switch 5. Thus, address counter 111 and control section 112 cooperate to write, into image data memory 114, that portion of the image data whose width is equal to the distance between the "0" point and the point where sliding member 6a is set.

Any read address of image data memory 114 is also designated by address counter 111 under the control of control section 101. More precisely, the read addresses at which characters of one row are to be stored, are designated by address counter 111 in accordance with the read-width data supplied to read-width memory address control section 112.

When the copier is set to the print mode after reading the image data, control section 101 outputs the operation command P to timing-signal generating section 102. Simultaneously, section 101 causes data selector 113 to read out the image data from memory 114, in accordance with the pulse signal supplied from main encoder unit 24. Control section 101 also calculates, from the output data items of temperature sensor 106, the power-supply voltage detector and print-density dial 8, an appropriate period during which to supply power to thermal elements of thermal print head 32. The data representing this period is supplied as print data to head drive circuit 115. In accordance with the print data, circuit 115 drives print head 32 in synchronism with the timing signal supplied from timing-signal generating section 102.

In the meantime, motor drive control section 104 supplies a motor-driving pulse signal to electric motor 41 in accordance with the pulse signal output by main encoder unit 24. Hence, motor 41 rotates ribbon take-up shaft 40 and, subsequently, take-up spool 73 of ribbon cassette 70. As a result, ribbon 81 is fed from the roll mounted on ribbon-feeding spool 74 and taken out around take-up spool 73, while kept in contact with thermal print head 32. Motor encoder unit 47 detects the rotation of motor 41, and generates a signal representative of the speed of motor 41. This signal is input to motor drive control section 104. In accordance with the signal, section 104 controls the torque of motor 41 such that ribbon 81 is taken up at a speed substantially equal to the speed of housing 1 being swept across a sheet of printing paper. As long as main encoder unit 24 supplies the reverse signal to motor drive control section 104, section 104 supplies no motor-driving pulses to electric motor 41. Therefore, ribbon 81 is neither fed from the roll nor taken up around take-up spool 73.

FIG. 5 is a circuit diagram showing main encoder unit 24 in detail. As is illustrated in this figure, rotation detector 27 has a pair of photodiodes 27a1 and 27a2 which are connected in series and located one side of disk 26. It also has a pair of phosesensors 27b1 and 27b2 which are arranged on the other side of disk 26. Main encoder unit 24 further comprises two amplifiers P1 and P2 and a flip-flop FF. The output of photosensor 27b1 is connected to amplifier P1, and the output of photosensor 27b2 is coupled to amplifier P2. The output of amplifier P1 is connected to the terminal D of flip-flop FF, whereas the output of amplifier P2 is connected to the clock input terminal CK of flip-flop FF.

FIG. 6A is a timing chart representing the waveforms of the signals SA and SB which flip-flop FF receives from amplifiers P1 and P2 and the signal SC which flip-flop FF outputs, while housing 1 is being moved forward across the original a to read data therefrom. Similarly, FIG. 6B is a timing chart representing the waveforms of the signals SA and SB which flip-flop FF receives from amplifiers P1 and P2 and the signal SC which flip-flop FF outputs, while housing 1 is being moved backward across the original a to read data therefrom.

Photodiodes 27a1 and 27a2 emit light toward photosensors 27b1 and 27b2, respectively. While housing 1 is moved forward across the original a, disk 26 rotates forward. As disk 26 rotates forward, the light emitted from photodiode 27a1 is first applied to photosensor 27b1 through a slit of disk 26, then the light from photodiode 27a2 is applied to photosensor 27b2 through the same slit of disk 26. Photosensors 27b1 and 27b2 convert the light beams into electric pulses, which are amplified by amplifiers P1 and P2. The outputs of amplifiers P1 and P2, or signals SA and SB, are input to flip-flop FF. As can be understood from FIG. 6A, flip-flop FF outputs a signal SC from its Q terminal, which rises to the high level at the leading edge of the first pulse of signal SB. The signal SC is a FORWARD signal.

Conversely, while housing 1 is moved backward across the original a, disk 26 rotates in reverse direction. As disk 26 rotates reversely, the light emitted from photodiode 27a2 is first applied to photosensor 27b2 through a slit of disk 26, then the light from photodiode 27a1 is applied to photosensor 27b1 through the same slit of disk 26. In this case, as can be understood from FIG. 6B, flip-flop FF outputs a signal SC from its Q terminal, which falls to the low level at the leading edge of the first pulse of signal SA. This signal SC is a REVERSE signal.

The operation of the hand-held copier will now be explained. To read the image data, such as characters and an image, from the original a, the operator moves mode-selecting switch 6 from the OFF-position (FIG. 1) to the R-position (FIG. 1). Then, the power-supply switch is automatically turned on, and control section 101 is automatically set to the read mode. Control section 101 turns on power-on indicating LED 7a, and gives the operation command R to timing-signal generating section 102. When sliding member 6a of switch 6 is moved to the R-position, cam pins 22 (FIG. 3) are moved to the sections 21b of cam slits. As a result, auxiliary roller unit 18 moves down, whereby auxiliary paper-contacting rollers 18a and 18b protrude downward, to the positions below first and second paper-contacting rollers 14a and 14b. In this condition, the operator turns on start switch 2, and places housing 1 upon the original a, thus setting rollers 14a, 14b, 18a, and 18b into contact with the original a. Since touch-detecting switch 17 contacts the original a, and start switch 2 has already been turned on, control section 101 is set into the read mode. As a result, control section 101 turns on LED array 16. (Also, control section 101 is set into the print mode when both touch-detecting switch 17 and start switch 2 are turned on.)

Figure 7:
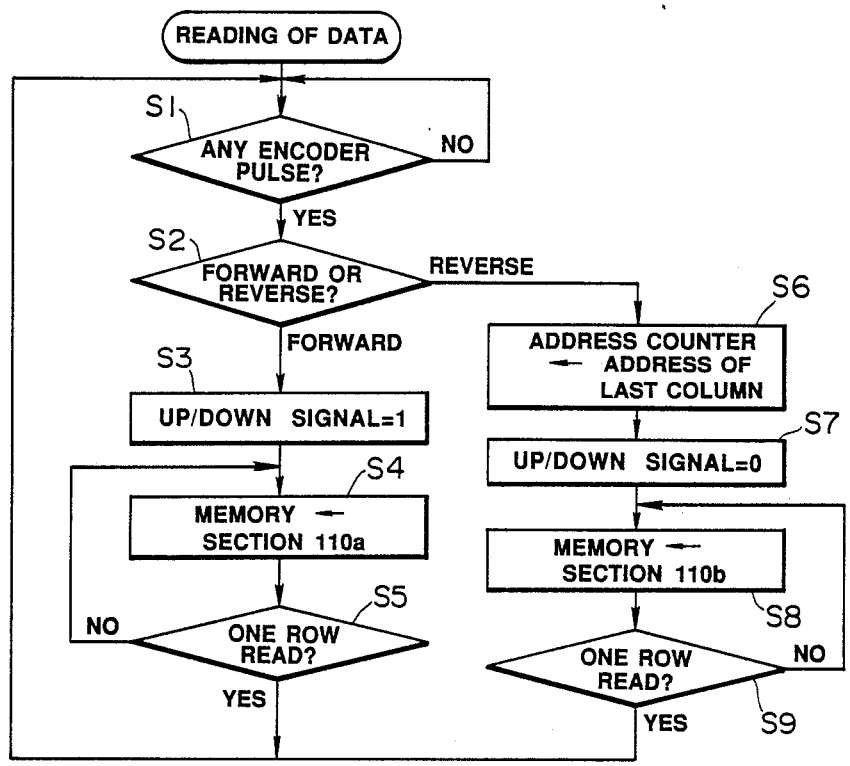
FIG. 7 is a flow chart explaining how the copier shown in FIG. 1 operates to read data.

With reference to FIG. 7, it will now be explained how the manual sweeping copier reads data from the original a when housing 1 is moved forward, and also when housing 1 is moved backward.

When the operator sweeps the copier forward, while keeping housing 1 in contact with the original a, the light emitted from LED array 16 illuminates the original a. The light reflected from the original a is focused by lens 60 and applied onto linear sensor 57. Meanwhile, second paper-contacting roller 14b is rotated as housing 1 is moved. As this roller rotates, disk 26 of main encoder unit 24 is rotated. Therefore, in step S1, rotation detector 27 produces a pulse signal representing the distance the housing has been swept forward across the original a (step S1). The pulse signal, which has been output from main encoder unit 24, is supplied to control section 101, timing signal-generating section 102, speed-detecting section 103, and motor drive control section 104. Since housing 1 is being moved forward, main encoder unit 24 outputs a forward signal to control section 101, timing signal-generating section 102, and motor drive control section 104. Section 102 outputs an UP signal to address counter 111 steps S2 and S3). The serial/parallel conversion section 110a is selected.

In the meantime, upon receipt of the operation command R from control section 101, timing signal-generating section 102 generates the CCD-exposure signal and supplies this signal to linear sensor 57. Also, section 102 outputs the read-timing signal A and the serial/parallel conversion signal B in response to the pulse signal output by main encoder unit 24. Signal A is supplied to A/D conversion section 109, and signal B is supplied to serial/parallel conversion sections 110a. Further, timing signal-generating section 102 produces the clock pulse signal C and supplies this signal C to address counter 111 and read-width memory address control section 112.

In synchronism with the CCD-exposure timing signal supplied from timing signal-generating section 102, linear sensor 57 generates image signals from the light which has been reflected from the original a. Amplifier 108 amplifies the image signals. The amplified image signals are input to A/D conversion section 109. A/D conversion section 109 converts the image signals into serial digital data, in synchronism with the read-timing signal A output by section 102. The serial digital data is input to serial/parallel conversion section 110a through AND gate AND 1. In synchronism with the serial/parallel conversion signal B supplied from timing signal-generating section 102, section 110a receives every eight bits from A/D conversion section 109 and shifts them forward, from the 0th bit to the 7th bit, thereby converting the serial data into parallel image data. This parallel image data is input to data selector 113. Since the copier has been set to the read mode, control section 101 supplies select signal D to selector 113. Further, in response to the forward signal supplied from main encoder unit 24, timing signal-generating section 102 supplies select signal E to data selector 113. Hence, data selector 113 selects the data output by serial/parallel conversion section 110a. The image data supplied from section 110a is therefore stored into image data memory 14 through data selector 113 (step S4).

Any write address of image data memory 114 is designated by the count value of address counter 111. Address counter 111 increments the column address by one in response to one clock pulse C supplied from timing signal-generating section 102, thereby updating the write address of memory 114. Every time one row of data is written into memory 114, timing signal-generating section 102 stops generating the timing signals A and B. Section 102 outputs on timing signals until it receives the next pulse signal from main encoder unit 24 (steps S4 and S5).

Reading-width switch 6 has been operated, thus setting a desired reading-width. The data representing the number of addresses, which corresponds to the desired reading-width, has been set to read-width memory address control section 112. Address counter 111 designates those write addresses of memory 114, the number of which is represented by the data set to section 112. Thus, the image data in the region, whose width is equal to the distance between the point "0" on the scale (FIG. 1) and the position of the sliding member 6a of reading-width switch 6 is written into image data memory 114.

Other one-row data items are read from the original a, one after another, and subsequently written into image data memory 114, as the operator further sweeps housing 1 across the original a in the forward direction.

When the operator sweeps housing 1 across that region of the original a in which the desired data is printed, he or she turns off start switch 2. Then, the operator lifts housing 1 from the original a. Touch-detecting switch 17 is automatically turned off. Thus, the data-reading operation is stopped.

When the operator sweeps the copier backward across the original a, while keeping housing 1 in contact with the original a, main encoder unit 24 outputs a signal representing the distance the housing 1 has been moved (step S1). At the same time, main encoder unit 24 produces a REVERSE signal (step S2). As a result of this, serial/parallel conversion section 110b is selected. The address of the last column of the first row is set, as the initial address, to address counter 111 (step S6, step S7). The images signals, which have been output by linear sensor 57 and amplified by amplifier 108, are supplied to A/D conversion section 109. A/D conversion section 109 converts the image signals into serial digital data, in synchronism with the read-timing signal A output by section 102. The serial digital data is input to serial/parallel conversion section 110b through AND gate AND2. In synchronism with the serial/parallel conversion signal B supplied from timing signal-generating section 102, section 110b receives every eight bits from A/D conversion section 109 and shifts them in reverse order, from the 7th bit to the 0th bit, thereby converting the serial data into parallel image data. This parallel image data is input to data selector 113. Since the copier has been set to the read mode, control section 101 supplies select signal D to selector 113. Further, in response to the reverse signal supplied from main encoder unit 24, timing signal-generating section 102 supplied select signal E to data selector 113. Hence, data selector 113 selects the data output by serial/parallel conversion section 110b. The image data supplied from section 110b is therefore stored into image data memory 114 though data 113 (step S8).

Any write address of image data memory 114 is designated by the count value of address counter 111. Address counter 111 decrements the column address by one in response to one clock pulse C supplied from timing signal-generating section 102, thereby updating the write address of memory 114. Every time one row of data is written into memory 114, timing signal-generating section 102 stops generating the timing signals A and B. Section 102 outputs on timing signals until it receives the next pulse signal from main encoder unit 24 (steps S9).

As has been explained, when the operator sweeps the copier backward across the original a to read data from the original a, the image signals, which represent dots forming each row of the image data, are written into image memory 114 in the order reverse to the order in which they have been output by linear sensor 57. Therefore, when these image signals stored in image memory 114 represent correct image, not an image reverse to the original one with respect to the direction in which the image has been scanned.

When the sliding member 6a of mode-selecting switch 6 is moved to the R-position, both auxiliary paper-contacting rollers 18a and 18b more protrude from the lower end of housing 1 than first and second paper-contacting rollers 14a and 14b. Therefore, housing is slightly titled forward as it is swept across the original a during the data-reading operation. Thus, neither print head 32 nor ribbon 81 wrapped around head 32 contacts the original a while housing 1 is moved across the original a. Print head 32 is prevented from being worn, and ribbon 81 does not make the original a dirty.

Speed-detecting section 103 detects the speed of housing 1, from the pulse signal output by main encoder unit 24. When the speed of housing 1 rises above a reference value, section 103 outputs a signal. This signal turns on speed alarm LED 7c, thus informing the operator that he or she is moving the copier too fast. When the remaining memory capacity of image data memory 114 decreases to a predetermined value, control section 101 turns on memory alarm LED 7b, thereby informing the operator that memory 114 will soon overflow.

Now, it will be explained how the manual copier operates to print the image data which has been read from the original a. At first, the operator moves the sliding member 6a of mode-selecting switch 6 to the P-position (FIG. 1). Then, control section 101 is set to the print mode. Section 101 supplies the select signal D to data selector 113, thereby connecting data selector 113 to control section 101. As sliding member 6a is moved, cam pits 22 move to horizontal sections 21a of cam slits 21 through slanted sections 21c. As a result, movable plate 19 is pushed upwardly, and auxiliary roller unit 18, which is fastened to plate 19, is moved upward. The lowest portions of auxiliary paper-contacting rollers 18a and 18b are thus positioned at the same level as the lowest portions of first and second paper-contacting rollers 14a and 14b. The operator places the copier upon the printing paper (e.g., a leaf of a notebook), with paper-contacting rollers 14a, 14b, 18a and 18b contacting the paper. When the copier is thus placed, touch-detecting switch 17 is automatically turned on, and print head 32 presses ribbon 81 onto the printing paper. Since print head 32 is urged downward by springs 33, it is held in contact with the printing paper as long as paper-contacting rollers 14a, 14b, 18a, and 18b contact the paper.

When the operator turns on start switch 2, control section 101 gives the operation command P to timing-signal generating section 102. Then, the operator sweeps housing 1 across the printing paper in the forward direction. When the speed of housing 1 rises above the reference value, section 103 causes speed alarm LED 7c, thus informing this fact. As housing 1 is moved forward, all paper-contacting rollers rotates. Disk 26, which is connected to second paper-contacting roller 14b by means of endless belt 28, is therefore rotated. Hence, main encoder unit 24 produces a pulse signal which represents the distance the copier has been swept across the printing paper. Further, unit 24 generates a forward signal. Both the pulse signal and the forward signal are input to motor drive control section 104.

In response to the pulse signal and the forward signal, motor drive control section 104 drives electric motor 41. Motor 41 in turn rotates ribbon take-up shaft 40, thereby rotating the take-up spool 73 in the ribbon take-up direction. As a result, ribbon 81 is fed from the roll mounted on ribbon-feeding spool 74 of ribbon cassette 70. Ribbon 81 passes by the heat-generating section of thermal print head 32 and subsequently taken up around take-up spool 73.

Motor encoder unit 47 detects the rotation of electric motor 41 and supplies one pulse to motor drive control section 104 every time motor shaft 41a rotates 360°. Section 104 determines the speed of motor 41 from the frequency at which unit 47 outputs pulses. Section 104 adjusts the torque of motor 41 such that the speed of motor 41 becomes equal to the speed at which housing 1 is being swept across the printing paper b. More specifically, motor drive control section 104 compares the number of the pulses which unit 24 generates while motor shaft 41a rotates 360°, with a predetermined value. If this number of pulses is greater than the predetermined value, that is, if housing 1 is being moved faster than ribbon 81 is being taken up around take-up spool 37, section 104 increases the width of the pulses for driving electric motor 41, thereby raising the ribbon take-up speed. Conversely, if said number of pulses is less than the predetermined value, that is, if housing 1 is being swept more slowly than ribbon is being taken up, motor drive control section 104 decreases the width of the motor-driving pulses, thus reducing the ribbon take-up speed. The larger the diameter of the roll of used ribbon, which is mounted on take-up spool 73, the greater the load applied on electric motor 41 and, hence, the lower the ribbon take-up speed. Therefore, section 104 increases the width of the motor-driving pulses, in proportion to the load exerted on motor 41, and thus increase the torque of motor 41, to the same value as the speed at which housing 1 is being swept across the printing paper b. Meanwhile, in accordance with the pulse signal supplied from main encoder unit 24, control section 101 gives a command to timing-signal generating section 102, in order to cause print head 32 to print one line of image data on printing paper. Upon receipt of this command, section 102 supplies a print-timing signal to head drive circuit 115. Control section 101 supplies an address control signal to address counter 111, in accordance with the pulse signal output by main encoder unit 24. In response to the address control signal, address counter 111 designates the row addresses and column addresses of image data memory 114, one after another. Hence, the image data stored in memory 114 is supplied via data selector 113 to head drive circuit 115, one-line data item at a time.

After giving section 102 the command for printing one-line of image data, control section 101 calculates the period of time during which to supply power to print head 32, from the print density set by turning print-density dial 8, the temperature of head 32 detected by temperature sensor 106, the number of dots forming the image data which is to be printed, and the output signal of the power-supply voltage detector. Further, control section 101 supplies head drive circuit 115 with the image data read out from memory 114 via data selector 113. In accordance with the image data and the timing signal output by timing-signal generating section 102, head drive circuit 115 drives thermal print head 32. Head 32 prints the image data on the printing paper, by thermally transferring the ink from ribbon 81 onto the paper.

As housing 1 is swept across the paper b, motor 41 rotates ribbon take-up shaft 40. Thus, take-up spool 73, which is coupled to shaft 40, is also rotated and takes up ribbon 81. The unused portion of ribbon 81 is, therefore, fed from the roll mounted on ribbon-feeding spool 74. The image data stored in memory 114 is printed, one line by one line, on the printing paper.

Data can be printed only when housing 1 is moved forward. As housing 1 is swept forward across the recording paper, the addresses of memory 114 are designated in the normal order, whereby the image data items are read from memory 114 in the same order as they have been read from the original a. The same holds true of the printing of the image data which has been read while housing 1 is being moved backward across the original a, since the items of this data have been written into image memory 114 in the order reverse to the order they have been read from the original a.

Hence, it is possible with the copier, described above, to read image data correctly from the original a, no matter whether housing 1 is being swept forward or backward across the original a. No data is written into memory 114, which represent an image which is reverse to the original, the left side right.

The image printed on the paper has the same width as the reading-width set by operating reading-width switch 5. Nonetheless, if enlarge-print key 3 has been depressed before the printing of the image data, the image printed on the paper b has a width which is greater than the one set by operating switch 5. Further, if reset/clear key 4 is depressed after the image data has been printed, the same image data can be printed again.

Figure 8:
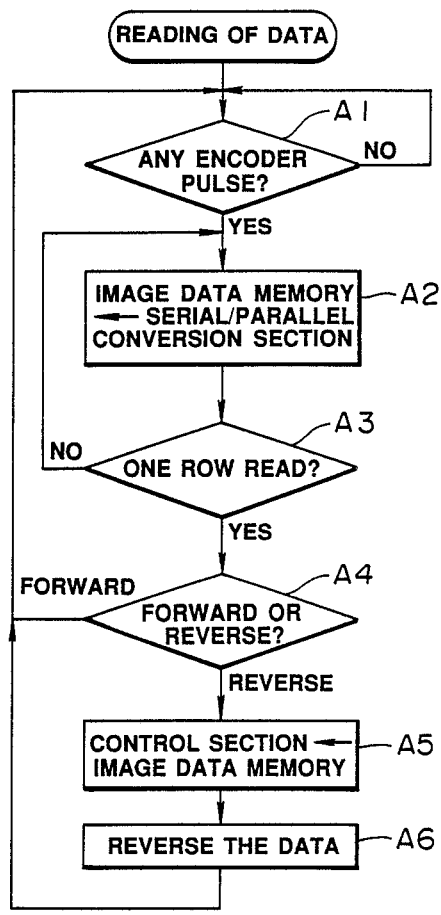
FIG. 8 is a flow chart explaining how a manually sweeping copier according to another embodiment of the invention operates to read data.

In the above embodiment, the data items read from the original a while housing 1 is being moved backward and representing dots forming the original image are supplied to serial/parallel conversion section 110b and are thereby shifted in the reverse order and converted into parallel data. The items of this parallel data, which represent the dots, are written at the column addresses of image memory 114 in the reserve order by means of the down counting of address counter 111. Instead, the data items read from the original a can be shifted in the forward order, and written into memory 114 in the forward order, and they can be read from memory 114 and supplied to control section 101, which reverses the order of these data items. It will be explained how the image data read from image data memory 114 is reversed, with reference to the flow chart of FIG. 8.

First, the copier is set to the read mode. As housing 1 is swept backward across the original a, serial/parallel conversion section 110a converts serial data into parallel data. The parallel data is written, row by row, into image data memory 114 in accordance with the reverse signal supplied from main encoder unit 24 (steps A4 and A5). Control section 101 reverses the order of the items of this image data, and the reversed data is written into image data memory 114 (step A6). Also in this case, the data items read from the original a while housing 1 is being swept backward across the original a are ultimately written into memory 114 in the order reverse to the order in which they have been read from the original a.

What is claimed is:

1. An image data reading apparatus, comprising:
housing means which is sweepable across a material bearing image data;
sweeping direction detecting means for detecting whether said housing means is swept in a forward or a backward direction relative to the material;
image sensing means having a plurality of image sensing portions in a row and carried by said housing means, for producing electronic image signals according to the image data on the material over which said housing means has been swept and for outputting the electric image signals produced by each of the image sensing portions in a predetermined order;
analog-to-digital converting means for converting the electric image signals output from said image sensing means, into items of digital image data;
first serial-to-parallel converting means for arranging a predetermined number of items of the digital image data in the same order as these data items have been output from said analog-to-digital converting means, and for outputting the data items thus arranged in parallel;
second serial-to-parallel converting means for arranging a predetermined number of items of the digital image data in an order reverse to the order in which these data items have been output from said analog-to-digital converting means, and for outputting, in parallel, the data items thus arranged; and selecting means for selecting said first serial-to-parallel converting means when said sweeping direction detecting means detects that said housing means is swept in the forward direction across the material, and for selecting said second serial-to-parallel converting means when said sweeping direction detecting means detects that said housing means is swept in the backward direction across the material, wherein one of said first serial-to-parallel converting means and said second serial-to-parallel converting means is selectively activated.

2. The image data reading apparatus according to claim 1, further comprising: memory means for storing the digital image data output from either of said first and second serial-to-parallel converting means; and memory control means having:

data writing means for writing the digital data items output from said first serial-to-parallel converting means, into said memory means in a predetermined order when said sweeping direction detecting means detects that said housing means is being swept forward across the material, and for writing the digital data items output from said second serial-to-parallel converting means, into said memory means in the order reverse to the predetermined one when said sweeping direction detecting means detects that said housing means is being swept backward across the material; and data outputting means for outputting the digital data items from said memory means in a predetermined order.

3. The image data reading apparatus according to claim 2, wherein said memory control means includes:

address counter means for addressing said memory means to write the digital data items into said memory means and to read the digital data items from said memory means; and counter control means for controlling said address counter means in accordance with the sweeping direction detected by said sweeping direction detecting means.

4. The image data reading apparatus according to claim 2, further comprising: printing means carried by said housing means, for printing on a printing medium an image represented by the digital data items output from said memory means while said housing means is swept across the printing medium.

5. The image data reading apparatus according to claim 1, further comprising:

position detecting means for detecting the position of said housing means with respect to said material, and for producing a position signal every time said housing means is swept for a predetermined distance, the position signal representing the position of said housing means with respect to said material;

memory means for storing the digital image data output from either of said first and said second serial-to-parallel converting means; and memory control means for controlling the writing of the digital data items into said memory means every time said position-detecting means outputs the position signal, and for designating addresses of said memory means in a predetermined order when said sweeping direction detecting means detects that said housing means is being swept forward, and in an order reverse to the predetermined one when said sweeping direction detecting means detects that said housing means is being swept backward.

6. The image data reading apparatus according to claim 5, wherein said memory means includes a plurality of storage locations in rows and columns; and said memory control means includes:

row addressing means for addressing one of the rows of the storage locations every time said position detecting means outputs the position signal; and column addressing means for addressing the columns of the row addressed by said row addressing means, in predetermined order when said sweeping direction detecting means detects that said housing means is being swept forward across the material, and in an order reverse to the predetermined one when said sweeping direction detecting means detects that said housing means is being swept backward across the material.

7. The image data reading apparatus according to claim 5, wherein said memory control means includes output control means for addressing said memory means to read digital data items from said memory means in predetermined order, further comprising printing means for printing on a printing medium an image represented by the digital data items read from said memory means.

8. The image data reading apparatus according to claim 7, wherein said printing means is carried by said housing means, further comprising printing control means for controlling said printing means in synchronism with the position signal output by said position detecting means, while said housing means is being swept across the printing medium.

9. The image data reading apparatus according to claim 7, wherein said housing means is manually sweepable across one of the material and the printing medium.

* * * * *